(12) United States Patent
Cao et al.

(10) Patent No.: US 12,461,747 B2
(45) Date of Patent: Nov. 4, 2025

(54) PROCESSOR, METHOD, DEVICE AND STORAGE MEDIUM FOR DATA PROCESSING

(71) Applicant: Beijing Youzhuju Network Technology Co., Ltd., Beijing (CN)

(72) Inventors: Yuhui Cao, Beijing (CN); Yunfeng Shi, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/979,402

(22) Filed: Dec. 12, 2024

(65) Prior Publication Data

US 2025/0110742 A1    Apr. 3, 2025

Related U.S. Application Data

(63) Continuation of application No. PCT/CN2023/098716, filed on Jun. 6, 2023.

(30) Foreign Application Priority Data

Jun. 14, 2022 (CN) .......................... 202210674857.6

(51) Int. Cl.
*G06F 9/30* (2018.01)
(52) U.S. Cl.
CPC .......... *G06F 9/3016* (2013.01); *G06F 9/3001* (2013.01); *G06F 9/30043* (2013.01)
(58) Field of Classification Search
None
See application file for complete search history.

(56) References Cited

U.S. PATENT DOCUMENTS

2007/0118832 A1\* 5/2007 Huelsbergen ....... G06F 9/45516
717/151
2014/0201499 A1 7/2014 Ould-Ahmed-Vall et al.
(Continued)

FOREIGN PATENT DOCUMENTS

CN    105706155 A    6/2016
CN    107003843 A    8/2017
(Continued)

OTHER PUBLICATIONS

International Search Report for PCT/CN2023/098716, mailed on Jul. 14, 2023, 5 pages.

(Continued)

*Primary Examiner* — Eric Coleman
(74) *Attorney, Agent, or Firm* — Astute IP Law Group

(57) ABSTRACT

A processor and a method, device and storage medium for data processing are provided. The processor includes an instruction decoder configured to decode a target instruction for a vector operation. The target instruction involves a target opcode, a source operand, and a target operand. The target opcode indicates a vector operation specified by the target instruction. The source operand specifies a source storage location in the memory for reading to-be-processed data. The target operand specifies a target storage location in the memory for writing a processed result. The processor further includes an arithmetic logic unit configured to: read the to-be-processed data from the source storage location of the memory; perform, on the to-be-processed data, an arithmetic logic operation associated with the vector operation specified by the target instruction; and write the processed result to the target storage location of the memory.

18 Claims, 4 Drawing Sheets

(56) References Cited

U.S. PATENT DOCUMENTS

| | | | |
|---|---|---|---|
| 2015/0095623 A1 | 4/2015 | Ermolaev et al. | |
| 2017/0315814 A1* | 11/2017 | Smith | G06F 9/3897 |
| 2018/0095758 A1* | 4/2018 | Dubtsov | G06F 9/3001 |
| 2018/0253310 A1 | 9/2018 | Stephens | |
| 2019/0102338 A1 | 4/2019 | Tang et al. | |
| 2019/0347104 A1* | 11/2019 | Plotnikov | G06F 9/3455 |
| 2020/0310809 A1 | 10/2020 | Hughes et al. | |
| 2020/0380370 A1* | 12/2020 | Lie | G06F 17/10 |
| 2021/0042260 A1 | 2/2021 | Reinhardt et al. | |
| 2022/0100680 A1* | 3/2022 | Chrysos | G06F 13/4027 |
| 2022/0206791 A1* | 6/2022 | Wong | G06F 9/223 |

FOREIGN PATENT DOCUMENTS

| | | | |
|---|---|---|---|
| CN | 107003846 | A | 8/2017 |
| CN | 104185838 | B | 12/2017 |
| CN | 104641346 | B | 6/2018 |
| CN | 108292232 | A | 7/2018 |
| CN | 108369516 | A | 8/2018 |
| CN | 109791488 | A | 5/2019 |
| CN | 109992240 | A | 7/2019 |
| CN | 113849769 | A | 12/2021 |

OTHER PUBLICATIONS

Office Action for Chinese Patent Application No. 202210674857.6, mailed on May 30, 2025, 15 pages.
Partial Supplementary European Search Report for European Patent Application No. 23822987.6, mailed on Aug. 19, 2025, 17 pages.

\* cited by examiner

PROCESSOR, METHOD, DEVICE AND STORAGE MEDIUM FOR DATA PROCESSING

CROSS-REFERENCE TO RELATED APPLICATIONS

This application is a continuation of International Application No. PCT/CN2023/098716, filed on Jun. 6, 2023, which claims priority to and benefit of Chinese Patent Application No. 202210674857.6, filed on Jun. 14, 2022, and entitled "PROCESSOR AND METHOD, DEVICE, AND STORAGE MEDIUM FOR DATA PROCESSING". The entireties of these applications are incorporated herein by reference.

FIELD

Example embodiments of the present disclosure generally relate to the field of computers, and in particular, to a processor and a method, device and computer-readable storage medium for data processing.

BACKGROUND

With the development of information technologies, various types of processors may be applied to a variety of scenarios. Different instruction set architectures (ISAs) that may be employed by processors have been proposed for various application scenarios. These instruction set architectures tend to be compatible with a wide variety of usage scenarios. For vector computations with high instruction repeatability and large data volume, a better instruction set architecture is needed to enable the processor to better process such vector computations.

SUMMARY

In a first aspect of the present disclosure, a processor is provided. The processor includes an instruction decoder configured to decode a target instruction for a vector operation. The target instruction involves a target opcode, a source operand, and a target operand. The target opcode indicates a vector operation specified by the target instruction. The source operand specifies a source storage location in the memory for reading to-be-processed data. The target operand specifies a target storage location in the memory for writing the processed result. The processor also includes an arithmetic logic unit coupled to the instruction decoder and the memory. The arithmetic logic unit is configured to: read to-be-processed data from the source storage location of the memory; perform, on the to-be-processed data, an arithmetic logic operation associated with the vector operation specified by the target instruction; and write the processed result to the target storage location of the memory.

In a second aspect of the present disclosure, a method for data processing is provided. The method includes decoding a target instruction for a vector operation. The target instruction involves a target opcode, a source operand, and a target operand. The target opcode indicates a vector operation specified by the target instruction. The source operand specifies a source storage location in the memory for reading to-be-processed data. The target operand specifies a target storage location in the memory for writing the processed result. The method further includes reading the to-be-processed data from the source storage location of the memory; performing an arithmetic logic operation associated with the vector operation specified by the target instruction to the to-be-processed data; and writing the processed result to the target storage location of the memory.

In a third aspect of the present disclosure, an electronic device is provided. The electronic device includes at least the processor according to the first aspect.

In a fourth aspect of the present disclosure, a computer-readable storage medium is provided. The computer-readable storage medium stores a computer program, and the computer program is executable by the processor to implement the method of the second aspect.

It should be understood that the content described in this content section is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, wherein.

DETAILED DESCRIPTION

Figure 1:
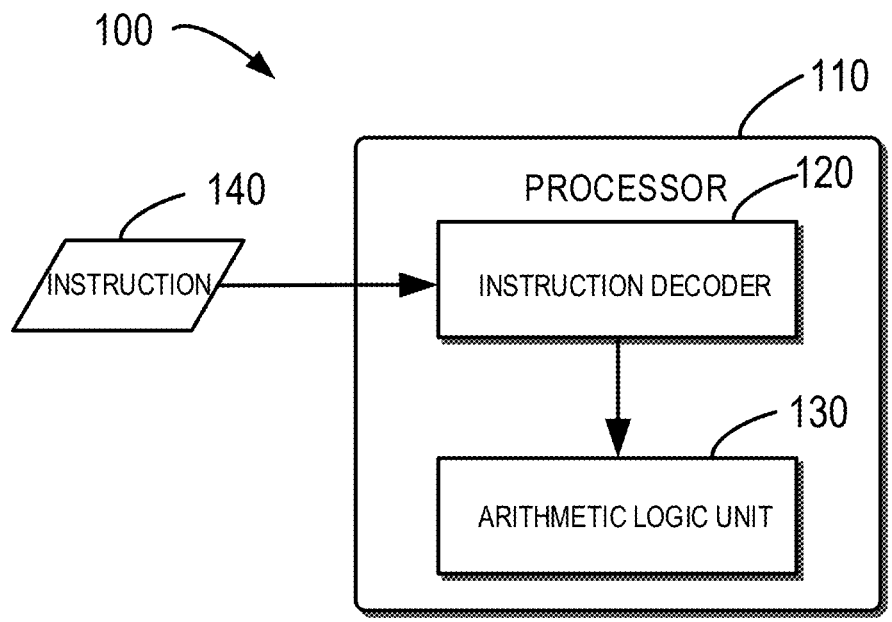
FIG. 1 illustrates a schematic diagram of an example environment in which embodiments of the present disclosure can be implemented.

Embodiments of the present disclosure will be described in more detail below with reference to the accompanying drawings. While certain embodiments of the present disclosure are shown in the accompanying drawings, it should be understood that the present disclosure may be implemented in various forms, and should not be construed as limited to the embodiments set forth herein, but rather, these embodiments are provided for a more thorough and complete understanding of the present disclosure. It should be understood that the drawings and embodiments of the present disclosure are for exemplary purposes only and are not intended to limit the scope of the present disclosure.

In the description of the embodiments of the present disclosure, the terms "including" and the like should be understood to include "including but not limited to". The term "based on" should be understood as "based at least in part on". The terms "one embodiment" or "the embodiment" should be understood as "at least one embodiment". The term "some embodiments" should be understood as "at least some embodiments". Other explicit and implicit definition may also be included below.

It may be understood that the data involved in the technical solution (including but not limited to the data itself, the acquisition or use of the data) should follow the requirements of the corresponding laws and regulations and related regulations.

As described above, with the development of information technologies, various types of processors may be applied to a variety of scenarios. Different instruction set architectures that may be employed by processors have been proposed for various application scenarios. These instruction set architectures tend to be compatible with a wide variety of usage scenarios. However, the use scenarios of these conventional instruction set architectures are not consistent with the use scenarios of vector computations such as neural network computations and the like. Therefore, for vector computations with high instruction repeatability and large data volume, a better instruction set architecture is needed to enable the processor to better process such vector computations.

One conventional approach is to employ a standard processor instruction set, such as a reduced instruction set computer (RISC)-V instruction set, or the like. Although these general-purpose instruction sets can complete various vector computations, such as various neural network operators, etc., it is difficult to guarantee higher execution efficiency since these general-purpose instruction sets need to be compatible with a wide variety of use scenarios. For example, neural network operator computations typically involve a large number of vector computations, which is not friendly to a general purpose instruction set.

It has been found that, for some large number of vector computations, the instruction set architecture of the conventional scheme is not applicable. For example, conventional schemes may use digital signal processor (DSP) architectures, such as single instruction multiple data (SIMD) architectures, or may use vector processor architectures. However, the instruction set of the DSP architecture described above is not generally disclosed. For vector processor architectures, such as vector instruction sets (abbreviated as RISC-V vector instruction sets) under the RISC-V standard, these instruction sets are usually high in complexity and redundant to vector computations such as neural network operators.

In summary, for vector calculation with high instruction repeatability and large data volume, it is necessary to design an instruction set more suitable for vector calculation, so as to improve the calculation efficiency of the processor.

According to an embodiment of the present disclosure, an improved solution for a processor is provided. In this scheme, the processor includes an instruction decoder and an arithmetic logic unit. The instruction encoder is configured to receive a target instruction for processing a vector operation. The target instruction is applicable to a memory to memory (MEM to MEM) processor architecture. For example, the target instruction involves a target opcode, a source operand, and a target operand. The target opcode indicates a vector operation specified by the target instruction, the source operand specifies at least a source storage location in the memory for reading the to-be-processed data, and the target operand specifies at least a target storage location in the memory for writing the processed result.

The arithmetic logic unit of the processor is coupled to the instruction decoder and the memory. The arithmetic logic unit is configured to execute the vector operation of the target instruction based on the decoded information of the instruction decoder for the target instruction. For example, the arithmetic logic unit is configured to: receive to-be-processed data from the source storage location of the memory; perform, on the to-be-processed data, an arithmetic logic operation associated with the vector operation specified by the target instruction; and write a processed result of the to-be-processed data to the target storage location of the memory.

The present solution simplifies the operation of the processor by employing a processor suitable for memory to memory architecture. In this way, the processor can use a simple instruction set to complete a large number of vector computations. For example, the processor can use a simple instruction set for neural network vector computation. In this way, the solution can use a simple instruction set to improve the efficiency of vector calculation performed by the processor.

FIG. 1 illustrates a schematic diagram of an example environment 100 in which embodiments of the present disclosure can be implemented. In this environment 100, the processor 110 may represent any kind of instruction processing apparatus. For example, the processor 110 may be a general purpose processor or any other suitable processor. The processor 110 is configured to receive the instructions 140 and execute operations, such as vector operations, indicated by the instructions 140. For example, processor 110 may receive instructions 140 from other devices in environment 100. In some embodiments, instruction 140 is an SIMD instruction.

The processor 110 includes an instruction decoder 120 and an arithmetic logic unit 130. Alternatively, or in addition, the processor 110 may also include a memory (not shown) or be communicatively coupled to the memory. For example, the memory may be a data storage (such as Vector Closely coupled Memory (VCCM)). Instruction decoder 120, arithmetic logic unit 130, and memory are communicatively coupled. That is, the instruction decoder 120, the arithmetic logic unit 130, and the memory may communicate with each other according to appropriate data transmission protocols and/or standards. In operation, the instruction decoder 120 receives the instruction 140 and decodes the instruction 140. For example, the instruction decoder 120 may decode the instructions 140 into arithmetic operations and/or logical operations, etc., that may be processed by the arithmetic logic unit 130. The instruction decoder 120 may be implemented using a variety of different mechanisms. For example, the instruction decoder 120 may be implemented using hardware circuitry, or at least partially by means of a software module.

The arithmetic logic unit 130 is configured to operate based on information obtained by the instruction decoder 120 decoding the instruction 140. The arithmetic logic unit 130 may perform various arithmetic operations, logical operations, and the like. The arithmetic logic unit 130 may be implemented using a variety of different mechanisms. For example, the arithmetic logic unit 130 may be implemented using hardware circuitry, or at least partially by means of a software module.

It should be understood that the structure and function of the environment 100 is described for exemplary purposes only and does not imply any limitation to the scope of the present disclosure. For example, the processor 110 may be applied in a variety of existing or future computing platforms or computing system. The processor 110 may be implemented in various embedded applications (e.g., data processing systems such as mobile network base stations, etc.) to provide services such as a large number of vector computations. The processor 110 may also be integrated or embedded in various electronic devices or computing devices to provide various computing services. An application environment and an application scenario of the processor 110 are not limited herein.

Figure 2:
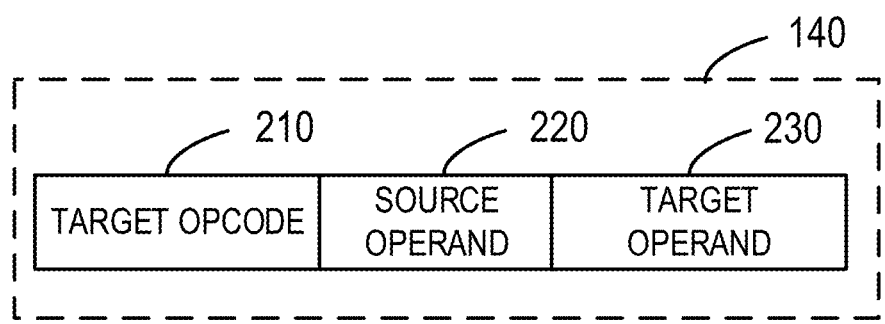
FIG. 2 illustrates a schematic diagram of example instructions according to some embodiments of the present disclosure.

In some embodiments, the instruction decoder 120 decodes the received instruction 140. The instruction 140 is also sometimes referred to herein as a "target instruction," "instruction" and "target instruction" are used interchangeably in this context. FIG. 2 illustrates a schematic diagram of an example instruction 140 according to some embodiments of the present disclosure. As shown in FIG. 2, the instruction 140 includes a target opcode 210, a source operand 220, and a destination operand 230. Herein, the target opcode 210 is also sometimes referred to as an "opcode", both of which may be used interchangeably in this context. The target opcode 210 may indicate a vector operation specified by the instruction 140. The source operand 220 is at least used to specify a source storage location in the memory for reading to-be-processed data. The target operand 230 is at least used to specify a target storage location in the memory for writing the processed result.

In some embodiments, the instruction decoder 120 decodes the above information indicated by the target opcode 210, the source operand 220, and the target operand 230 for processing by the arithmetic logic unit 130. For example, arithmetic logic unit 130 is configured to read to-be-processed data from the source storage location in memory specified by source operand 220. The arithmetic logic unit 130 performs the arithmetic logic operation associated with the vector operation specified by the instruction 140 on the data to be processed. The arithmetic logic unit 130 further writes a processed result of the to-be-processed data into the target storage location specified by the target operand 230.

In some embodiments, the instructions 140 may be encoded using, for example, binary. In other embodiments, the instructions 140 may be encoded using other encoding forms or other systems. Herein, unless otherwise specified, the encoding format and the encoded representation of the instruction 140 described below are taken as an example. For example, the binary form of the instruction 140 may be definition in the following format in Table 1.

referred to as a first storage space of memory) within a memory, for example, a data memory, such as VCCM. The address index is in units of one vector word. A vector word may represent a memory cell of a lane within memory that is width in width of SIMD. That is, the address index is in units of one SIMD width. In some embodiments, the depth of the memory is, for example, 1024. In this example, only 10 bits in bits 70 through 85 may be used to represent the address index of the A lane. Of course, it should be understood that the memory may have other suitable depths, and the address index may have other suitable numbers of bits.

For another example, the source operand A_index from the 60th bit to the 69th bit is used to represent the element index of the vector word of the A-lane in the memory. Each vector word may have, for example, 64 elements. The element index may be used to indicate some of the vector words within the A lane. In some embodiments, if the vector word of A lane is divided into, for example, 64 elements, then only 6 bits in $60^{th}$ to $69^{th}$ bits may be used to represent A_index. For another example, source operand A_vm from bit 54 to bit 59 is used to represent index of the vector mask (VM) register of the A lane. In some embodiments, the A lane has 16 VM registers. In such an example, only 4 bits in $54^{th}$ to $59^{th}$ bits may be used to represent A_vm.

Similarly, source operand B_vaddr from $38^{th}$ to $53^{rd}$ bits is used to represent an address index of a B lane (also referred to as a second memory space of memory) within a memory (e.g., data memory VCCM), i.e., an address index of VCCM [B_vaddr]. The address index is in units of one vector word. That is, the address index is in units of one SIMD width. The source operand B_index of $28^{th}$ to $37^{th}$ bits is used to represent the element index of the vector word of the B lane. The source operand B_vm of $22^{nd}$ a to $27^{th}$ bits is used to represent index of the vector mask register of the B lane.

An example of the target operand 230 in Table 1 includes the C_vaddr of $6^{th}$ to $21^{st}$ bits may represent the address index of the C lane of the data memory VCCM, i.e., the address index of VCCM[C_vaddr]. The address index is in units of one vector word. That is, the address index is in units

TABLE 1

| Instruction Format Definitions |
| --- |
| Bit |

| [95:86] | [85:70] | [69:60] | [59:54] | [53:38] | [37:28] | [27:22] | [21:6] | [5:0] |
| --- | --- | --- | --- | --- | --- | --- | --- | --- |
| Opcode | A_vaddr | A_index | A_vm | B_vaddr | B_index | B_vm | C_vaddr | C_vm |

As shown in Table 1, $86^{th}$ to $95^{th}$ bits are used to represent the target opcode 210 of instruction 140. Each operand from $22^{nd}$ a to $85^{th}$ bits is used to represent the source operand 220 of instruction 140. Each parameter of the 0th bit to $21^{st}$ bit is used to represent the target operand 230 of the instruction 140. Of course, it should be understood that any particular numerical value or number of bits appearing herein and elsewhere herein is exemplary, unless specifically stated. For example, the number of bits in which each opcode and/or operand listed above is located is exemplary and not limiting. The target opcode 210, the source operand 220, and the destination operand 230 of the instruction 140 may be located at other suitable numbers of bits.

For example, source operand A_vaddr from $70^{th}$ to $85^{th}$ bits is used to represent an address index of data, i.e., an address index of VCCM[A_vaddr], of an A lane (also of one SIMD width. An example of the target operand 230 also includes a C_vm of $0^{th}$ to $5^{th}$ bits, which represents an index of the vector mask register of the C lane.

Figure 3:
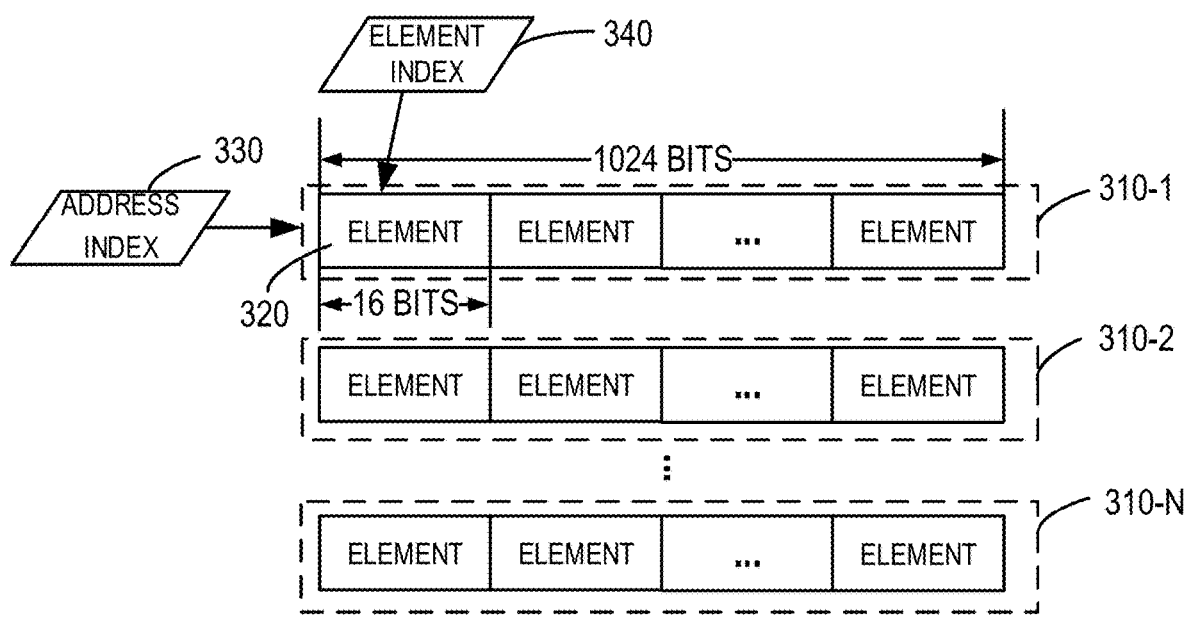
FIG. 3 illustrates a schematic diagram of a storage location corresponding to an example source operand according to some embodiments of the present disclosure.

FIG. 3 illustrates a schematic diagram of a storage location corresponding to an example source operand according to some embodiments of the present disclosure. In the example of FIG. 3, the memory space of the memory is divided into a plurality of lanes, such as a lane 310-1, lane 310-2, . . . , a lane 310-N, etc., where N is an integer greater than 1. For ease of discussion, the lane 310-1, the lane 310-2, . . . , the lane 310-N are collectively or individually referred to hereinafter as lane(s) 310. In some embodiments, the value of N may be preset. For example, N may be set to different values, such as 1024, 512, etc. Each lane 310 includes, for example, 1024 bits or other suitable number of bits. Address index 330 (e.g., source operand A_vaddr, B_vaddr, or target operand C_vaddr) may indicate the address of lane 310-1. The address of lane 310 may be in units of vector words. The address index 330 may be 16 bits. For example, if the address index 330 is "0b0000_0000_0000_0000", the address index 330 may indicate the lane 310-1. For another example, in some embodiments, in an example where the depth of the memory or the number of lanes is 1024, the address index 330 may also be 10 bits, for example, the address "0b00_0000_0000" indicating the lane 310-1. Note that the encoded representations beginning with "0b" herein each represent a binary representation, which will not be repeated hereinafter. The "_" appearing in the binary representation is for ease of view only, without the actual meaning, and does not occupy binary bits.

In some embodiments, the vector word of each lane 310 may be divided into a plurality of elements, such as element 320. Element 320 may comprise, for example, 64 bits. The element index 340 (e.g., source operand A_index or B_index) may indicate an element, such as an index of element 320. The element index 340 may be 10 bits. For example, if element index 340 is "0b00_0000_0000", then element index 340 may indicate element 320. For another example, in an example in which the number of elements in the vector word of each lane 310 is 64, the element index may be 6 bits, for example, the element index "0b00_0000" may indicate the element 320.

It should be understood that any particular numerical value, number of bits, and binary representation appearing herein and elsewhere herein are exemplary, unless specifically stated. For example, in other embodiments, each lane may have a different number of bits, and each vector word may also adopt a different number of bits. Accordingly, the address index and the element index may also have different numbers of bits and different encoded representations. The scope of the present disclosure is not limited in this respect.

Several examples of source operands 220 are enumerated above with reference to Table 1. More examples of source operands 220 will be described below with reference to Table 2.

TABLE 2

Instruction Format Definitions

| Bit | [95:86] | [85:54] | [53:22] | [21:6] | [5:0] |
|---|---|---|---|---|---|
| | Opcode | A_imm | B_imm | C_vaddr | C_vm |

As shown in Table 2, source operand 220 may include A_imm in $54^{th}$ to $85^{th}$ bits, representing an immediate in instruction 140. Similarly, source operand 220 may also include B_imm located in $22^{nd}$ a to $53^{rd}$ bits, representing another immediate in instruction 140. Similar to Table 1, the target operand 230 in Table 2 may also include C_vaddr an/or C_vm.

It should be understood that each source operand and/or each target operand described above in connection with Tables 1 and 2 is merely exemplary and not limiting. The source operand 220 and/or the destination operand 230 employed by the present disclosure may include any one or more of the above source operands and/or destination operands. In some embodiments, source operand 220 and/or destination operand 230 may include any other suitable operand type that is different than the source operand and/or destination operand above.

Table 3 below describes an example coding scheme for the opcode of instruction 140. For example, if the $0^{th}$ bit is 0, it indicates that the instruction 140 is a variable type. If the $0^{th}$ bit is 1, it indicates that the instruction 140 is an immediate type. The $1^{st}$ to $2^{nd}$ bits represent sub-function encoding of instruction 140. The $3^{rd}$ to $7^{th}$ bits represent the functional encoding of instruction 140. The $8^{th}$ to $9^{th}$ bits represent the computational precision of instruction 140. For example, the binary "00" may indicate that the calculation precision is a single-precision floating-point number. Other binary values may represent other computational precision of the Reserved.

TABLE 3

Example Opcode Coding Scheme

| Length | 2 bits | 5 bits | 2 bits | 1 bit |
|---|---|---|---|---|
| Range | 9:8 | 7:3 | 2:1 | 0:0 |
| Name | Calculation Precision | Functional Encoding | Sub-Functional Encoding | Immediate/Variable |
| Description | 2'b00: fp32 Other: Reserved | Functional Encoding | Sub-Functional Encoding | 0: Variable 1: Immediate |

Of course, it should be understood that the encoding scheme of the opcode of the instruction 140 shown in Table 3 is merely exemplary and not limiting. For example, in other embodiments, other encoding manners may be used to encode the instruction 140.

In some embodiments, the vector operation specified by the instruction 140 may be determined based on the target opcode 210 of the instruction 140. For example, the processor 110 may pre-store an operation code of each instruction. The instruction decoder 120 may determine the vector operation specified by the instruction 140 based on the target opcode 210 of the received instruction 140. For example, if the target opcode 210 of the instruction 140 is encoded as "0b00_00110_01_0", the instruction decoder 120 may determine the instruction 140 as a v2indexr instruction. It should be understood that the above enumerated examples of opcodes and instruction types are merely exemplary and not limiting. Instructions having encoded as "0b00_00110_01_0" may also specify other vector operations.

Several examples of the instruction 140 and the example execution of the processor 110 on the execution 140 will be described below. In some embodiments, the source operand 220 may include two source operands, such as A_vaddr and B_vaddr, or A_vaddr and B_imm. The width of each source operand may be a SIMD width. Alternatively, or additionally, in some embodiments, the source operand 220 may include only one source operand B_vaddr or the like. The target operand 230, e.g., C_vaddr, may specify that the processed result is written back to the target storage location of the memory, i.e., VCCM[C_vaddr].

In some embodiments, the target storage location of the instruction 140 includes a processed result vector. The target operand 230 also indicates a target VM register, such as C_vm or vm3. A value at each location of the target VM register indicates whether a respective processed result is to be written at a respective location of the processed result vector. For example, if the target register vm3[i] is 1, it indicates that the i-th element of the processed result vector word is write enable, and may be written into a corresponding processed result. On the contrary, if the target register vm3[i] is 0, the i-th element of the processed result vector word cannot be written into the corresponding processed result.

Table 4 describes several example instructions that the processor 110 may support. The instructions of Table 4 may be described with reference to the instruction definition of Table 1 or Table 2, and may be encoded with reference to the example coding scheme of Table 3. In the example of Table 4, the target operand 230 includes C_vaddr (i.e., &v3) and C_vm (i.e., vm3). The reserved bits in Table 4 represent one or more reserved bits. These reserved bits may be subsequently encoded or used.

TABLE 4

Example Instructions

| [95:86] | [85:70] | [69:60] | [59:54] | [53:38] | [37:28] | [27:22] | [21:6] | [5:0] |
|---|---|---|---|---|---|---|---|---|
| Opcode | A_vaddr | A_index | A_vm | B_vaddr | B_index | B_vm | C_vaddr | C_vm |
| v2index1 | &v1 | Reserved | Reserved | &v2 | index2 | Reserved | &v3 | vm3 |
| v2index1i | &v1 | Reserved | Reserved |  | imm2 |  | &v3 | vm3 |
| v2indexr | &v1 | Reserved | Reserved | &v2 | index2 | Reserved | &v3 | vm3 |
| v2indexri | &v1 | Reserved | Reserved |  | imm2 |  | &v3 | vm3 |
| sindex2v | &v1 | Reserved | Reserved | &v2 | index2 | Reserved | &v3 | vm3 |
| s2v | Reserved | Reserved | Reserved | &v2 | index2 | Reserved | &v3 | vm3 |
| vexp | &v1 | Reserved | Reserved | Reserved | Reserved | Reserved | &v3 | vm3 |
| vm2index | Reserved | Reserved | vm1 | Reserved | Reserved | Reserved | &v3 | vm3 |
| vindex2vm | Reserved | Reserved | Reserved | &v2 | index2 | Reserved | Reserved | vm3 |
| vtranspose | &v1 | index1 | vm1 | Reserved | Reserved | Reserved | &v3 | vm3 |

As one embodiment, the instruction 140 includes a first index determination instruction (e.g., v2index1 or v2indexr in Table 4). In this example, the source operand 220 specifies the location of the first storage space of the memory, i.e., the address index of lane A (A_vaddr is &v1). The source operand 220 also specifies a given index value of the data to be processed within the second storage space of the memory, i.e., the element index within the vector word of lane B (B_vaddr is &v2, B_index is index2). In this example, the arithmetic logic unit 130 is configured to determine the first index. The first index indicates a storage location of a value in the to-be-processed data at a location indicated by a given index value in the first storage space.

For example, the opcode of instruction v2index1 may be encoded as "0b00_00110_00_0", instruction v2index1 v1, v2, index2, v3, vm 3 represents assigning v3[i] to indext, where indext is an index of the first element from left to right capable of making v1 [indext] equal to v2[index2]. If no element satisfies the above conditions, indext is set to "−1" represented by the binary complement. In some embodiments, the target operand 230 also indicates a target vector mask register. A value at each location of the target vector mask register indicates whether a respective processed result is to be written at a respective location of the processed result vector. For example, if vm3[i] is equal to 1, v3[i] is write-enabled.

As another example, the opcode of instruction v2indexr may be encoded as "0b00_00110_01_0". The instructions v2indexr v1, v2, index2, v3, vm3 represent assigning v3[i] to indext, where indext is an index that enables v1 [indext] to be equal to the first element from right to left of v2[index2]. If no element satisfies the above conditions, indext is set to "−1" represented by the binary complement. In this example, v3[i] is write-enabled if vm3[i] is equal to 1.

As another example, the instruction 140 includes a second index determination instruction (e.g., v2index1i or v2indexri in Table 4). In this example, the source operand 220 specifies the location of the first storage space of the memory, i.e., the address index of lane A (A_vaddr is & v1). The source operand 220 also specifies a first immediate, i.e., an immediate imm2. In this example, the arithmetic logic unit is configured 130 to determine the second index. The second index indicates a storage location of the first immediate in the first storage space.

For example, the opcode of instruction v2index1i is encoded as "0b00_00110_00_1". The instructions v2index1i v1, imm2, v3, vm3 represent assigning v3[i] to indext, where indext is an index that enables v1[indext] to be equal to the first element from left to right of imm2. If no element satisfies the above conditions, indext is set to "−1" represented by the binary complement. In this example, v3[i] is write-enabled if vm3[i] is equal to 1.

As another example, the opcode of instruction v2indexri may be encoded as "0b00_00110_01_1". The instructions v2indexri v1, imm2, v3, vm3 represent assigning v3[i] to indext, where indext is an index that enables v1 [indext] to be equal to the first element from right to left of imm2. If no element satisfies the above conditions, indext is set to "−1" represented by the binary complement. In this example, v3[i] is write-enabled if vm3[i] is equal to 1.

As another example, the instruction 140 may include a first numerical value determination instruction, such as the instruction sindex2v in Table 4. The source operand 220 specifies the location of the first storage space of the memory, i.e., the address index of lane A (A_vaddr is <v1). The source operand 220 also specifies a given index value of the data to be processed within the second storage space of the memory, i.e., the element index within the vector word of lane B (B_vaddr is & v2, B_index is index2).

In this example, the arithmetic logic unit 130 is configured to determine a given value of the data to be processed at a location indicated by a given index value, and determine a first value in the first storage space at a location indexed at a given value. For example, the instructions sindex2v v1, v2, index2, v3, vm3 have an opcode encoded as "0000_0010_10_0". The instruction represents assigning v3[i] to v1[v2[index2]]. If vm3[i] is equal to 1, v3[i] is write-enabled.

In some embodiments, the instruction 140 includes a second numerical value determination instruction. In this example, the source operand 220 specifies a given index value of the data to be processed within the second storage space of the memory, i.e., B_vaddr is & v2, B_index is index2. The arithmetic logic unit 130 is configured to determine a second value in the to-be-processed data at a location indicated by a given index value. For example, the instructions s2v v2, index2, v3, vm3 have an opcode encoded as "0b00_0010_10_1". The instruction represents assigning v3[i] to v2[index2]. If vm3[i] is equal to 1, v3[i] is write-enabled.

By using one or more of the above described instructions, such as the first index determination instruction, the second index determination instruction, the first numerical value determination instruction, and the second numerical value determination instruction, the processor 110 may better process some operators such as solving the coordinates, for example an index of maximum value (ArgMax) operator, an index of the minimum value (ArgMin) operator, or a top-ranked K value (TopK) operator. Taking ArgMax as an example, it is used to obtain an index such that the value v [index] in the vector v is the maximum value. The instruction required for ArgMax of 64 elements is as follows: First, v2smax v1, vm1, v2, vm2 (the instruction will be described in Table 5 and Table 6 below), the instruction obtains the largest element value in v1 and writes it to v2, where the storage values of vm1 and vm2 are all 1; next, v2index1 v1, v2, 0, v3, vm 3, the instruction is indexed so that v1 [index] is equal to v2 [0], and the value of index is written to v3, where all bits of the vm3 storage value are 1.

In some embodiments, the target instruction includes a vector transpose instruction, such as an instruction vtranspose or vstranspose. The source operand 220 specifies a first location in the first storage space in the memory, that is, A_vaddr is & v1, and A_index is index1. Source operand 220 also specifies source vector mask register vm1 and optional vm2. In this example, the arithmetic logic unit 130 is configured to perform vector translocation on the to-be-processed data at the first location in the first storage space to obtain transposed to-be-processed data.

For example, the vector transpose instruction vtranspose v1, index1, vm1, vm2, v3, vm3, has an opcode encoded as 0000_00111_11_0 for transposing a 32*32 vector (or matrix), for example. In this example, the values of vm1 and vm2 are read lane enabled; the value of vm3 is the write lane enabled. The number R of consecutive bits 1 in vm1 is used to represent the number of rows of the matrix, and the number C of bits that are 1 consecutive in vm2 is used to represent the number of columns of the matrix, where R and C are any natural numbers, and R and C may be the same or different. The significant bits of vm1, vm2, and vm3 need to be contiguous, otherwise taking the first 1 at the lowest bit. The vector transpose instruction vtranspose may be used to transpose the matrix of R*C.

For another example, in some embodiments, the vector transpose instruction vstranspose v1, index1, vm1, v3, vm3 may be used to transpose the square matrix. In this example, the value of vm1 is read lane enabled; the value of vm3 is write lane enabled. The number R of consecutive 1 bits in vm1 is used to represent the number of rows (or columns) of the square array. The vector transpose instruction vstranspose may be used to transpose the square matrix of R*R.

The vector transpose instruction is not a standard RISC type instruction. In a conventional standard RISC type instruction set, a translocation function of a vector must be completed by a plurality of transposed instructions. By using the vector translocation instruction, the computing capacity of a part of networks can be improved. For example, for a neural network training process, a large number of matrix or square matrix translocation operations are generally involved. By utilizing the vector translocation instruction of the scheme, the calculation efficiency of the neural network training process can be improved.

In some embodiments, the target instruction includes an exponential instruction, such as vexp. In this example, the source operand 220 specifies the source storage location, i.e., A_vaddr is &v1. The arithmetic logic unit 130 is configured to determine an exponent value of a predetermined value (e.g., the natural base number e) as the base number by taking the data to be processed at the source storage location as a power. For example, vexp v1, v3, vm3, with an opcode encoded as "0b00_01000_01_0" indicates that v3[i] is assigned as exp(v1[i]). If vm3[i] is equal to 1, v3[i] is write-enabled.

The above exponential instruction is applicable to operators such as sigmoid operators and hyperbolic functions sinh/cosh/tanh. For example, the sigmoid operator, the sinh operator, the cosh operator, and the tanh operator may be represented by the following Equations (1)-(4).

$$S(x) = \frac{1}{1+e^{-x}} = \frac{e^x}{e^x+1}. \tag{1}$$

$$\sinh x = \frac{e^x - e^{-x}}{2} \tag{2}$$

$$\cosh x = \frac{e^x + e^{-x}}{2} \tag{3}$$

$$\tanh x = \frac{\sinh x}{\cosh x} = \frac{e^x - e^{-x}}{e^x + e^{-x}} \tag{4}$$

In Equations (1)-(4), x represents the data to be processed. For example, in a neural network activation function, sigmoid and hyperbolic functions are more common. By using the index instruction of the scheme, the calculation efficiency can be improved.

In some embodiments, the instructions 140 include VM register instructions, such as vm2index instructions. The source operand 220 indicates a source VM register, i.e., vm1, in memory. The arithmetic logic unit is configured to store the index at the enabled location in the source VM register at the target storage location. For example, instructions vm2index vm1, v3, vm3, have an opcode encoded as "0b00_01100_01_0", which represents v3[i]=vm1[i]?i: −1. That is, if the value of vm1[i] is 1, v3[i] is assigned to i, whereas if the value of vm1[i] is 0, v3[i] is assigned to −1 (e.g., "−1" of the binary complement representation). If vm3[i] is equal to 1, v3[i] is write-enabled.

In some embodiments, the instructions 140 include one-hot code conversion instructions, such as vindex2vm. This is a VM register operation instruction. In this example, the source operand 220 specifies a given index value of the data to be processed within the second storage space of the memory, i.e., B_vaddr is & v2, B_index is index2. The behavior of the read vector mask register involved in the instruction is not write-enabled of the memory (the instruction of other write memory needs to read the vector mask register as the write-enabled). The target operand 230 specifies a target VM register, vm3. The arithmetic logic unit is configured to convert the value of the data to be processed at a given index value to a one-hot code and store the one-hot code into the target VM register. For example, instructions vindex2vm v2, index2, vm3, with an opcode encoded as "0b00_10000_01_0". The instruction represents assigning vm3 to one hot (v2 [index2]), where onehot( ) represents a one-hot code conversion function.

The one-hot code conversion instructions described above apply to index class instructions and may support one-hot code operators. The numbers are converted to one-hot encoded form. For example, in actual use, the following two instructions may be used to implement: vindex2vm v, 0, vm 1, and vmload vm1, v2, vm2, where the first instruction is used to convert the value of v1[0] into a one-hot encoded form, and write vm1, and the second instruction (vmload will be described in Table 7 and Table 8 below) is used to store the value in vm1 to v2, where the storage value of vm2 is all 1.

Examples of various types of instructions 140 supported by the processor 110 of the present disclosure are described above in connection with Table 4. It should be understood that the processor 110 of the present disclosure may also support more instructions. Table 5 below shows an example of more conventional instructions 140 supported by the processor 110. The instructions of Table 5 may be described with reference to the instruction definition of Table 1 or Table 2, and the opcode is encoded using the example coding scheme of Table 3.

TABLE 5

Example Conventional Instructions

| [95:86] | [85:70] | [69:60] | [59:54] | [53:38] | [37:28] | [27:22] | [21:6] | [5:0] |
|---|---|---|---|---|---|---|---|---|
| Opcode | A_vaddr | A_index | A_vm | B_vaddr | B_index | B_vm | C_vaddr | C_vm |
| vadd | &v1 | Reserved | Reserved | &v2 | Reserved | Reserved | &v3 | vm3 |
| vaddi | &v1 | Reserved | Reserved | | imm2 | | &v3 | vm3 |
| vsub | &v1 | Reserved | Reserved | &v2 | Reserved | Reserved | &v3 | vm3 |
| vsubi | &v1 | Reserved | Reserved | | imm2 | | &v3 | vm3 |
| vmax | &v1 | Reserved | Reserved | &v2 | Reserved | Reserved | &v3 | vm3 |
| vmaxi | &v1 | Reserved | Reserved | | imm2 | | &v3 | vm3 |
| vmin | &v1 | Reserved | Reserved | &v2 | Reserved | Reserved | &v3 | vm3 |
| vmini | &v1 | Reserved | Reserved | | imm2 | | &v3 | vm3 |
| vmul | &v1 | Reserved | Reserved | &v2 | Reserved | Reserved | &v3 | vm3 |
| vmuli | &v1 | Reserved | Reserved | | imm2 | | &v3 | vm3 |
| vdiv | &v1 | Reserved | Reserved | &v2 | Reserved | Reserved | &v3 | vm3 |
| vdivi | &v1 | Reserved | Reserved | | imm2 | | &v3 | vm3 |
| vrecipi | &v1 | Reserved | Reserved | | imm2 | | &v3 | vm3 |
| vsignj | &v1 | Reserved | Reserved | &v2 | Reserved | Reserved | &v3 | vm3 |
| vsignji | &v1 | Reserved | Reserved | | imm2 | | &v3 | vm3 |
| vsignjn | &v1 | Reserved | Reserved | &v2 | Reserved | Reserved | &v3 | vm3 |
| vsignjni | &v1 | Reserved | Reserved | | imm2 | | &v3 | vm3 |
| vsignjx | &v1 | Reserved | Reserved | &v2 | Reserved | Reserved | &v3 | vm3 |
| vsignjxi | &v1 | Reserved | Reserved | | imm2 | | &v3 | vm3 |
| vand | &v1 | Reserved | Reserved | &v2 | Reserved | Reserved | &v3 | vm3 |
| vandi | &v1 | Reserved | Reserved | | imm2 | | &v3 | vm3 |
| vor | &v1 | Reserved | Reserved | &v2 | Reserved | Reserved | &v3 | vm3 |
| vori | &v1 | Reserved | Reserved | | imm2 | | &v3 | vm3 |
| vxor | &v1 | Reserved | Reserved | &v2 | Reserved | Reserved | &v3 | vm3 |
| vxori | &v1 | Reserved | Reserved | | imm2 | | &v3 | vm3 |
| vshiftl | &v1 | Reserved | Reserved | &v2 | index2 | Reserved | &v3 | vm3 |
| vshiftli | &v1 | Reserved | Reserved | | imm2 | | &v3 | vm3 |
| vshiftr | &v1 | Reserved | Reserved | &v2 | index2 | Reserved | &v3 | vm3 |
| vshiftri | &v1 | Reserved | Reserved | | imm2 | | &v3 | vm3 |
| vcopy | &v1 | Reserved | Reserved | | Reserved | | Reserved | Reserved |
| si2v | Reserved | Reserved | Reserved | | imm2 | | &v3 | vm3 |
| vceil | &v1 | Reserved | Reserved | | Reserved | | Reserved | Reserved |
| vfloor | &v1 | Reserved | Reserved | | Reserved | | Reserved | Reserved |
| vfclass | &v1 | Reserved | Reserved | | Reserved | | Reserved | Reserved |
| vsum | &v1 | Reserved | vm1 | | Reserved | | Reserved | Reserved |
| v2smax | &v1 | Reserved | vm1 | | Reserved | | Reserved | Reserved |
| v2smin | &v1 | Reserved | vm1 | | Reserved | | Reserved | Reserved |
| vclear | &v1 | Reserved | vm1 | | Reserved | | Reserved | Reserved |

The functions and definition of the various instructions in Table 5 will be shown by Table 6. The functions of these instructions include various addition, subtraction, multiplication, division, averaging, averaging, reciprocal (supporting only an immediate), shifting an operand according to a given value, and so on. These instructions provide a basic computation of the processor 110, which is not described in detail herein.

TABLE 6 example functions of conventional instructions

| Instruction | Encoded representation of the opcode | Function |
|---|---|---|
| vadd v1, v2, v3, vm3 | 0b00_00001_00_0 | V3[i] = v1[i] + v2[i] # if vm3[i] is equal to 1, then v3[i] is write-enabled. |
| vaddi v1, imm2, v3, vm3 | 0b00_00001_00_1 | V3[i] = v1[i] + imm2 # if vm3[i] is equal to 1, then v3[i] is write-enabled. |

TABLE 6-continued example functions of conventional instructions

| Instruction | Encoded representation of the opcode | Function |
|---|---|---|
| vsub v1, v2, v3, vm3 | 0b00_00001_01_0 | V3[i] = v1 [i] − v2 [i] # if vm3[i] is equal to 1, then v3[i] is write-enabled. |
| vsubi v1, imm2, v3, vm3 | 0b00_00001_01_1 | V3[i] = v1 [i] − imm2 # if vm3[i] is equal to 1, then v3[i] is write-enabled. |
| vmax v1, v2, v3, vm3 | 0b00_00001_10_0 | V3[i] = MAX (v1 [i], v2 [i]) # if vm3[i] is equal to 1, then v3[i] is write-enabled. |
| vmaxi v1, imm2, v3, vm3 | 0b00_00001_10_1 | V3[i] = MAX (v1 [i], imm2) # if vm3[i] is equal to 1, then v3[i] is write-enabled. |
| vmin v1, v2, v3, vm3 | 0b00_00001_11_0 | V3[i] = MIN (v1 [i], v2 [i]) # if vm3[i] is equal to 1, then v3[i] is write-enabled. |
| vmini v1, imm2, v3, vm3 | 0b00_00001_11_1 | V3[i] = MIN (v1 [i], imm2) # if vm3[i] is equal to 1, then v3[i] is write-enabled. |
| vmul v1, v2, v3, vm3 | 0b00_00010_00_0 | V3[i] = v1 [i] * v2 [i] # if vm3[i] is equal to 1, then v3[i] is write-enabled. |
| vmuli v1, imm2, v3, vm3 | 0b00_00010_00_1 | V3[i] = v1 [i] * imm2 # if vm3[i] is equal to 1, then v3[i] is write-enabled. |
| vdiv v1, v2, v3, vm3 | 0b00_00010_10_0 | V3[i] = v1 [i]/v2 [i] # if vm3[i] is equal to 1, then v3[i] is write-enabled. |
| vdivi v1, imm2, v3, vm3 | 0b00_00010_10_1 | V3[i] = v1 [i]/imm2 # if vm3 [i] is equal to 1, then v3[i] is write-enabled. |
| vrecipi v1, imm2, v3, vm3 | 0b00_00010_11_1 | V3[i] = imm2/v1 [i] # if vm3[i] is equal to 1, then v3[i] is write-enabled. |
| vsignj v1, v2, v3, vm3 | 0b00_00100_00_0 | V3[i] = {v2 [i] [DW −1], v1 [i] [DW −2: 0]} # if vm3[i] is equal to one, then v3[i] is write-enabled. |
| vsignji v1, imm2, v3, vm3 | 0b00_00100_00_1 | V3[i] = {imm2 [DW −1], v1 [i] [DW −2: 0]} # if vm3[i] is equal to one, then v3[i] is write-enabled. |
| vsignjn v1, v2, v3, vm3 | 0b00_00100_010 | V3[i] = {~v2 [i] [DW −1], v1 [i] [DW −2: 0]} # if vm3[i] is equal to one, then v3[i] is write-enabled. |
| vsignjni v1, imm2, v3, vm3 | 0b00_00100_01_1 | V3[i] = {~imm2 [DW −1], v1 [i] [DW −2: 0]} # if vm3[i] is equal to one, then v3[i] is write-enabled. |
| vsignjx v1, v2, v3, vm3 | 0b00_00100_10_0 | V3[i] = {v1 [i] [DW −1] {circumflex over ( )} v2 [i] [DW −1], v1 [i] [DW −2: 0]} # if vm3[i] is equal to one, then v3[i] is write-enabled. |
| vsignjxi v1, imm2, v3, vm3 | 0b00_00100_10_1 | V3[i] = {v1 [i] [DW −1] imm2 [DW −1], v1 [i] [DW −2: 0]} # if vm3[i] is equal to one, then v3[i] is write-enabled. |
| vand v1, v2, v3, vm3 | 0b00_00101_00_0 | V3[i] = v1 [i] & v2 [i] # if vm3[i] is equal to 1, then v3[i] is write-enabled. |
| vandi v1, imm2, v3, vm3 | 0b00_00101_00_1 | V3[i] = v1 [i] & imm2 # if vm3[i] is equal to 1, then v3[i] is write-enabled. |
| vor v1, v2, v3, vm3 | 0b00_00101_01_0 | V3[i] = v1 [i] \| v2 [i] # if vm3[i] is equal to 1, then v3[i] is write-enabled. |
| vori v1, imm2, v3, vm3 | 0b00_00101_01_1 | V3[i] = v1 [i] \| imm2 # if vm3[i] is equal to 1, then v3[i] is write-enabled. |
| vxor v1, v2, v3, vm3 | 0b00_00101_10_0 | V3[i] = v1 [i] v2 [i] # if vm3[i] is equal to 1, then v3[i] is write-enabled. |
| vxori v1, imm2, v3, vm3 | 0b00_00101_10_1 | V3[i] = v1 [i] imm2 # if vm3[i] is equal to 1, then v3[i] is write-enabled. |
| vshiftl v1, v2, index2, v3, vm3 | 0b00_00111_00_0 | V3[i] = v1 [mod (i − v2 [index2], LANE_NUM)], element cyclic left shift. # If vm3[i] is equal to 1, v3[i] is write-enabled. |
| vshiftli v1, imm2, v3, vm3 | 0b00_00111_00_1 | V3[i] = v1 [mod (i − imm2, LANE_NUM)], element cyclic left shift. # If vm3[i] is equal to 1, v3[i] is write-enabled. |
| vshiftr v1, v2, index2, v3, vm3 | 0b00_00111_01_0 | V3[i] = v1 [mod (i + v2 [index2], LANE_NUM)], the element is cyclically shifted right. # If vm3[i] is equal to 1, v3[i] is write-enabled. |
| vshiftri v1, imm2, v3, vm3 | 0b00_00111_01_1 | V3[i] = v1 [mod (i + imm2, LANE_NUM)], the element is cyclically shifted right. # If vm3[i] is equal to 1, v3[i] is write-enabled. |
| vcopy v1, v3, vm3 | 0b00_01000_00_0 | V3[i] = v1 [i] # if vm3[i] is equal to 1, then v3[i] is write-enabled. |
| si2v imm2, v3, vm3 | 0b00_01000_00_1 | V3[i] = imm2 # if vm3[i] is equal to 1, then v3[i] is write-enabled. |
| vceil v1, v3, vm3 | 0b00_01000_10_0 | V3[i] = ceil (v1 [i]) # if vm3[i] is equal to 1, then v3[i] is write-enabled. |
| vfloor v1, v3, vm3 | 0b00_01000_11_0 | V3[i] = floor (v1 [i]) # if vm3 [i] is equal to 1, then v3[i] is write-enabled. |

TABLE 6-continued example functions of conventional instructions

| Instruction | Encoded representation of the opcode | Function |
|---|---|---|
| vfclass v1, v3, vm3 | 0b00_01001_00_0 | V3[i] = class (v1 [i]) # if vm3 [i] is equal to 1, then v3[i] is write-enabled. |
| vsum v1, vm1, v3, vm3 | 0b00_01010_00_0 | V3[i] = SUM (vm1 [j]? v1 [j]: 0) for j from 0 to LANE_NUM −1 # if vm3[i] is equal to 1, then v3[i] is write-enabled. |
| v2smax v1, vm1, v3, vm3 | 0b00_01010_10_0 | V3[i] = MAX (vm1 [j]? v1 [j]: − INF) for j from 0 to LANE_NUM −1 # if vm3[i] is equal to 1, then v3[i] is write-enabled. |
| v2smin v1, vm1, v3, vm3 | 0b00_01010_11_0 | V3[i] = MIN (vm1 [j]? v1 [j]: + INF) for j from 0 to LANE_NUM −1 # if vm3[i] is equal to 1, then v3[i] is write-enabled. |
| vclear v1, vm1, v3, vm3 | 0b00_01100_00_0 | v3[i] = vm1[i] ? 0: vm1 [i] # if vm3[i] is equal to 1, v3[i] is write-enabled. |

The MAX( ) and MIN( ) functions in Table 6 represent a function of determining a maximum value and determining a minimum value, respectively. The DW represents the width of the vector word, LANE_NUM represents the number of elements in one vector word, the mod( ) function represents the remainder function, ceil( ) and floor( ) functions represent rounding up and down, respectively, and the SUM( ) function represents the summation function.

In some embodiments, the instructions supported by the processor 110 also include various vector mask register access and operation instructions. Several examples of vector mask register access and operation instruction are shown in Table 7. The functions and definition of the various instructions in Table 7 will be shown by Table 8. The functions of these instructions include read, write, and operation of vector mask registers. The behavior of the read vector mask registers involved in these instructions, not the write enable as a memory write (the instructions written to the memory all require the read vector mask register as the write enable). These instructions are not described in detail herein.

TABLE 8

Functionality of the Vector Mask Register instruction

| Instruction | Encoded representation of the opcode | Function |
|---|---|---|
| vmset v1, index1, vm3 | 0b00_10000_00_0 | vm3 = {v1 [index1], v1[index − 1]} |
| vmseti imm1, imm2, vm3 | 0b00_10000_00_1 | vm3 = {imm1, imm2} |
| vmand vm1, vm2, vm3 | 0b00_10001_00_0 | vm3 = vm1 & vm2 |
| vmor vm1, vm2, vm3 | 0b00_10001_01_0 | vm3 = vm1 \| vm2 |
| vmxor vm1, vm2, vm3 | 0b00_10001_10_0 | vm3 = vm1 ^ vm2 |
| vcmpeq v1, v2, vm3 | 0b00_10010_00_0 | vm3[i] = (v1[i] == v2[i]) ? 1:0 |
| vcmpeqi v1, imm2, vm3 | 0b00_10010_00_1 | vm3[i] = (v1[i] == imm2) ? 1:0 |

TABLE 7

Example Vector Mask Register Instruction Coding

| [95:86] | [85:70] | [69:60] | [59:54] | [53:38] | [37:28] | [27:22] | [21:6] | [5:0] |
|---|---|---|---|---|---|---|---|---|
| Opcode | A_vaddr | A_index | A_vm | B_vaddr | B_index | B_vm | C_vaddr | C_vm |
| vmset | &v1 | index1 | Reserved | Reserved | Reserved | Reserved | Reserved | vm3 |
| vmseti | | imm1 | | | imm2 | | Reserved | vm3 |
| vmand | Reserved | Reserved | vm1 | Reserved | Reserved | vm2 | Reserved | vm3 |
| vmor | Reserved | Reserved | vm1 | Reserved | Reserved | vm2 | Reserved | vm3 |
| vmxor | Reserved | Reserved | vm1 | Reserved | Reserved | vm2 | Reserved | vm3 |
| vcmpeq | &v1 | Reserved | Reserved | &v2 | Reserved | Reserved | Reserved | vm3 |
| vcmpeqi | &v1 | Reserved | Reserved | | imm2 | | Reserved | vm3 |
| vcmpne | &v1 | Reserved | Reserved | &v2 | Reserved | Reserved | Reserved | vm3 |
| vcmpnei | &v1 | Reserved | Reserved | | imm2 | | Reserved | vm3 |
| vcmplt | &v1 | Reserved | Reserved | &v2 | Reserved | Reserved | Reserved | vm3 |
| vcmplti | &v1 | Reserved | Reserved | | imm2 | | Reserved | vm3 |
| vcmpge | &v1 | Reserved | Reserved | &v2 | Reserved | Reserved | Reserved | vm3 |
| vcmpgei | &v1 | Reserved | Reserved | | imm2 | | Reserved | vm3 |
| vmload | Reserved | Reserved | vm1 | Reserved | Reserved | Reserved | v3 | vm3 |

TABLE 8-continued

Functionality of the Vector Mask Register instruction

| Instruction | Encoded representation of the opcode | Function |
|---|---|---|
| vcmpne v1, v2, vm3 | 0b00_10010_01_0 | vm3[i] = (v1[i] != v2[i]) ? 1:0 |
| vcmpnei v1, imm2, vm3 | 0b00_10010_01_1 | vm3[i] = (v1[i] != imm2) ? 1:0 |
| vcmplt v1, v2, vm3 | 0b00_10010_10_0 | vm3[i] = (v1[i] < v2[i]) ? 1:0 |
| vcmplti v1, imm2, vm3 | 0b00_10010_10_1 | vm3[i] = (v1[i] < imm2) ? 1:0 |
| vcmpge v1, v2, vm3 | 0b00_10010_11_0 | vm3[i] = (v1[i] >= v2[i]) ? 1:0 |
| vcmpgei v1, imm2, vm3 | 0b00_10010_11_1 | vm3[i] = (v1[i] >= imm2) ? 1:0 |
| vmload vm1, v3, vm3 | 0b00_10011_00_0 | {v3[2j + 1], v3[2j]} = vm1, for j from 0 to LANE_NUM/2 − 1. # v3[i] is write-enabled where vm3[i] = 1 |

In some embodiments, the instructions 140 supported by the processor 110 also include internal register access and operation instructions. Such instructions are used to handle access to internal registers and some special operations. For example, write internal control and status (CSR) registers, write fixed values, or some SIMD length data in a data store VCCM, etc. As another example, the internal CSR register is read out or the data memory VCCM is read out; and the empty instruction (i.e., no operation is taken, waiting for 1 cycles), etc.

Table 9 below shows several examples of internal register access and operation instruction. Table 10 shows the functions of the various instructions in Table 9. These instructions are not described in detail herein. Note that for the vwcsr instruction in Table 9, the source operand is in A lane; and for the vwcsri instruction, the immediate number is in the B lane.

TABLE 9

Example Internal Register Instruction

| [95:86] | [85:70] | [69:60] | [59:54] | [53:38] | [37:28] | [27:22] | [21:6] | [5:0] |
|---|---|---|---|---|---|---|---|---|
| Target Opcode | A_vaddr | A_index | A_vm | B_vaddr | B_index | B_vm | C_vaddr | C_vm |
| vnop | Reserved | Reserved | Reserved | Reserved | Reserved | Reserved | Reserved | Reserved |
| vwcsr | &v1 | Reserved | Reserved | Reserved | Reserved | Reserved | Reserved | Reserved |
| vwcsri | | Reserved | | | imm2 | | Reserved | Reserved |
| vrcsr | Reserved | Reserved | Reserved | Reserved | Reserved | Reserved | &v3 | vm3 |

TABLE 10

Example Functions of Internal Register Instructions

| Instruction | Encoded representation of the opcode | Function |
|---|---|---|
| vnop | 0b00_11000_00_0 | No Operation |
| vwcsr v1, CSRs | 0b00_11001_00_0 | CSR [i] = v1 [i], vm3 is write-enabled for each i. |
| vwcsri imm2, CSRs | 0b00_11001_00_1 | CSR [i] = imm2, vm3 is write-enabled for each i. |
| vrcsr CSRs, v3, vm3 | 0b00_11001_01_0 | V3[i] = CSR [i] # if vm3[i] is equal to 1, then v3[i] is write-enabled. |

The various instructions supported by the processor 110 are described above in conjunction with Tables 4-10. These instructions may be decoded by the instruction decoder 120 of the processor 110 and executed by the arithmetic execution unit 130. These instructions may constitute a set of instructions supported by the processor 110. It should be understood that, in some embodiments, the instruction set may be constructed only by some or all of the above instructions. Alternatively, or additionally, other suitable instructions not described above may also be employed to construct the set of instructions supported by the processor 110.

Further, it should be understood that while the example instruction definitions and example opcode representations specified above with reference to Tables 1-3 list the various instructions in Tables 4-10, this is merely exemplary and not limiting. The instruction sets supported by the processor of the present disclosure may be defined and encoded in any suitable manner. For example, each bit of each instruction may have a different meaning than represented by each bit in Table 1 or Table 2. For another example, an encoded representation of an opcode of each instruction may have a different number of bits than in Table 3, and each bit may have a different meaning from each bit in Table 3. The encoded representations of the opcode of the various instructions in Tables 4-10 above may be changed or interchanged. Various instructions may also be represented using other names. The scope of the present disclosure is not limited in this respect.

The instruction described above does not include a branch type instruction, nor includes a load/store type instruction. Unlike conventional SIMD processors, such as vector register files, the registers employed by the present disclosure are memory to memory SIMD processor architectures. The set of instruction set defines a plurality (e.g., 64 or more or fewer) vector mask registers for representing the particular vector that each SIMD instruction needs to process.

The present solution simplifies the operation of the processor 110 by employing a SIMD processor suitable for memory to memory architecture. In this way, the processor 110 can use a simple instruction set to complete a large number of vector computations. For example, the processor 110 can use a simple instruction set to perform tasks such as vector calculation of a neural network operator. In this way, the solution can use a simple instruction set to improve the efficiency of vector calculation performed by the processor. For computations such as neural network training and/or inference, aspects of the present disclosure can greatly improve computational efficiency. For example, a processor according to an embodiment of the present disclosure may support various index determination instructions, thereby improving the efficiency of various vector computations such as getting coordinates. In another example, the processor of the present disclosure may process, for example, a vector translocation instruction, thereby improving a calculation efficiency of a corresponding calculation in a neural network training process. As another example, the processor of the present disclosure can support exponential instructions such that computational efficiency, such as sigmoid operators and hyperbolic function operators, is improved and optimized.

Figure 4:
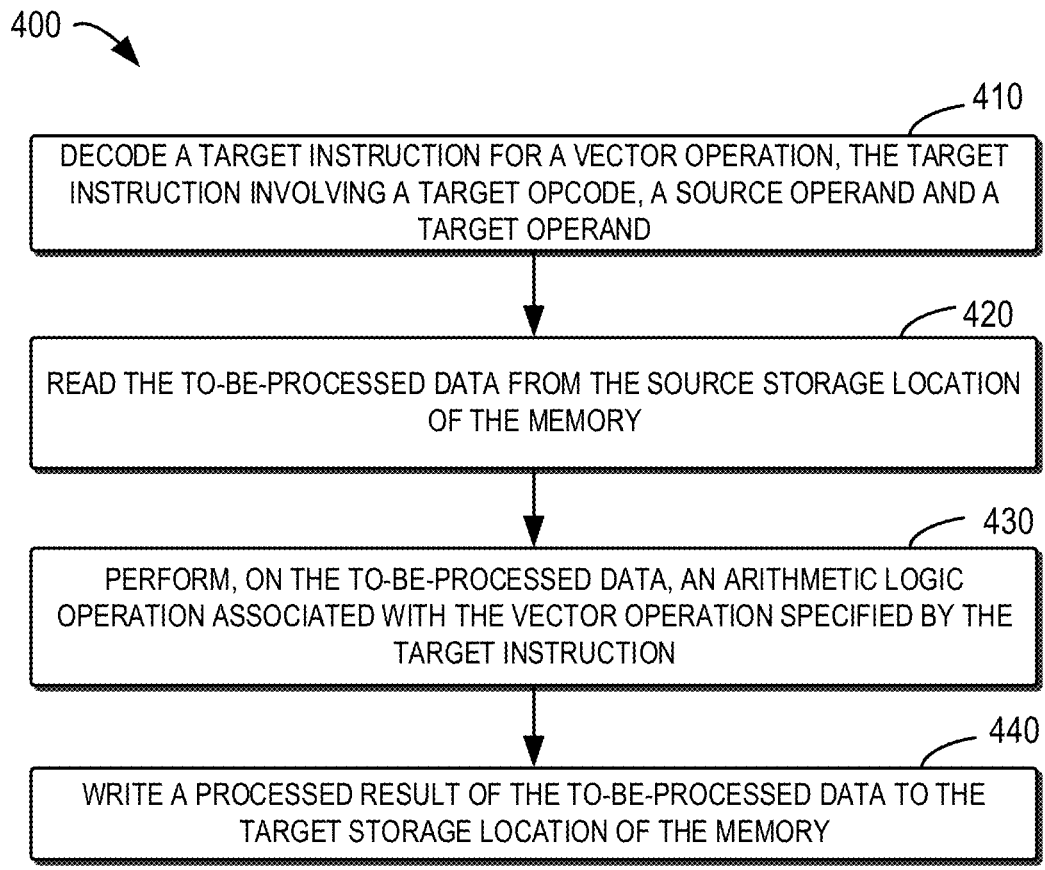
FIG. 4 shows a flowchart of a process for data processing according to some embodiments of the present disclosure.

FIG. 4 shows a flowchart of a process 400 for data processing according to some embodiments of the present disclosure. The process 400 may be implemented at the processor 110. For ease of discussion, the process 400 will be described with reference to the environment 100 of FIG. 1.

At block 410, the processor decodes a target instruction, such as the instruction 140, for a vector operation. For example, the instruction 140 may be decoded by the instruction decoder 120 of the processor 110. The instruction 140 involves a target opcode 210, a source operand 220, and a target operand 230. The target opcode 210 indicates a vector operation specified by the instruction 140. The source operand 220 specifies at least a source storage location in memory for reading data to be processed. The target operand 230 specifies at least the target storage location in the memory for writing a processed result.

At block 420, the processor reads the to-be-processed data from the source storage location of the memory. For example, the to-be-processed data may be read from the source storage location of the memory by the arithmetic logic unit 130 of the processor 110. At block 430, the processor 110 performs an arithmetic logic operation associated with the vector operation specified by the target instruction on the data to be processed. For example, the arithmetic logic operation may be performed by the arithmetic logic unit 130 of the processor 110. At block 440, the processor 110 writes a processed result of the to-be-processed data into the target storage location of the memory. For example, the processed result may be written into the target storage location by the arithmetic logic unit 130 of the processor 110.

In some embodiments, the instruction 140 includes an index determination instruction. The index determination instruction may be a first index determination instruction (v2index1 or v2indexr) or a second index determination instruction (v2index1i or v2indexri). The source operand 220 specifies a location of the first storage space of the memory, and the source operand 220 also specifies a given index value or a first immediate of the data to be processed within the second storage space of the memory. At block 430, the arithmetic logic operation performed by the processor 110 includes determining a first index or determining a second index. The first index indicates a storage location of a value in the to-be-processed data at a location indicated by the given index value in the first storage space. The second index indicates a storage location of the first immediate in the first storage space.

In some embodiments, the instruction 140 includes a first value determination instruction (e.g., instruction sindex2v), the source operand 220 specifying a location of the first storage space of the memory, the source operand 220 also specifying a given index value of the data to be processed within the second storage space of the memory. At block 430, the arithmetic logic operations performed by the processor 110 include: determining a given value of the data to be processed at a location indicated by a given index value; and determining a first value in the first storage space at a location indexed by the given value.

In some embodiments, the instruction 140 includes a second value determination instruction, such as the instruction s2v. The source operand 220 specifies a given index value of the data to be processed within the second storage space of the memory. At block 430, the arithmetic logic operation performed by the processor 110 includes determining a second value in the data to be processed at a location indicated by the given index value.

In some embodiments, the instruction 140 includes a vector transpose instruction, such as an instruction vtranspose or vstranspose. The source operand 220 specifies a first location in a first storage space in memory. At block 430, the arithmetic logic operation performed by the processor 110 includes: performing a vector translocation on the to-be-processed data at the first location in the first storage space to obtain transposed to-be-processed data.

In some embodiments, instruction 140 includes an exponential instruction, such as instruction vexp. The source operand 220 specifies a source storage location. At block 430, the arithmetic logic operation performed by the processor 110 includes determining an exponential value with a predetermined value as a base number and with the to-be-processed data at the source storage location as a power.

In some embodiments, the instructions 140 include VM register instructions, such as vm2index. The source operand 220 of the instruction 140 indicates a source VM register in memory. At block 430, the arithmetic logic operation performed by the processor 110 includes storing an index at an enabled location in the source VM register at the target storage location.

In some embodiments, the target storage location of each instruction 140 described above includes a processed result vector. The target operand 230 also indicates a target VM register. A value at each location of the target VM register indicates whether a respective processed result is to be written at a respective location of the processed result vector. For example, if the target register vm3[i] is 1, it indicates that the i-th element of the processed result vector word is write enabled, and may be written into a corresponding processed result. On the contrary, if the target register vm3[i] is 0, the i-th element of the processed result vector word cannot be written into the corresponding processed result.

In some embodiments, the instructions 140 include one-hot code conversion instructions, such as instructions vindex2vm. The source operand 220 specifies a given index value of the data to be processed within the second storage space of the memory. The target operand 230 specifies a target VM register. At block 430, the processor 110 converts the value of the data to be processed at a given index value to a one-hot code. The processor 110 is further configured to store the one-hot code into the target VM register.

Figure 5:
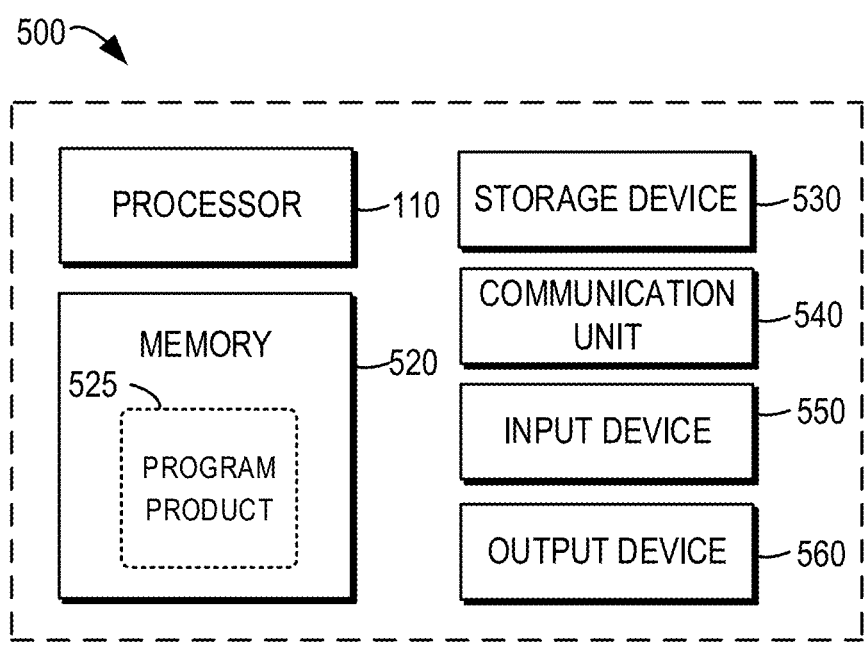
FIG. 5 illustrates a block diagram of an electronic device in which a processor may be included in accordance with one or more embodiments of the present disclosure.

FIG. 5 shows a block diagram of an electronic device 500 in which a processor 110 according to one or more embodiments of the present disclosure may be included. It should be understood that the electronic device 500 illustrated in FIG. 5 is merely exemplary and should not constitute any limitation on the functionality and scope of the embodiments described herein.

As shown in FIG. 5, the electronic device 500 is in the form of a general-purpose electronic device or a computing device. Components of the electronic device 500 may include, but are not limited to, one or more processors 110, a memory 520, a storage device 530, one or more communication units 540, one or more input devices 550, and one or more output devices 560. In some embodiments, the processor 110 may perform various processes according to a program stored in the memory 520. The processor 110 may be a multi-core processor that may execute computer-executable instructions in parallel to improve parallel processing capabilities of the electronic device 500.

Electronic device 500 typically includes a plurality of computer storage media. Such media may be any available media accessible to the electronic device 500, including, but not limited to, volatile and non-volatile media, removable and non-removable media. The memory 520 may be volatile memory (e.g., registers, caches, random access memory (RAM)), non-volatile memory (e.g., read-only memory (ROM), electrically erasable programmable read-only memory (EEPROM), flash memory), or some combination thereof. Storage device 530 may be a removable or non-removable medium and may include a machine-readable medium, such as a flash drive, magnetic disk, or any other medium, which may be capable of storing information and/or data (e.g., training data for training) and may be accessed within electronic device 500.

The electronic device 500 may further include additional removable/non-removable, volatile/non-volatile storage media. Although not shown in FIG. 5, a disk drive for reading or writing from a removable, nonvolatile magnetic disk (e.g., a "floppy disk") and an optical disk drive for reading or writing from a removable, nonvolatile optical disk may be provided. In these cases, each drive may be connected to a bus (not shown) by one or more data media interface. The memory 520 may include a computer program product 525 having one or more program modules configured to perform various methods or actions of various embodiments of the present disclosure. For example, these program modules may be configured to implement various functions or actions of the processor 110, such as implementing the functions of the instruction decoder 120 and the arithmetic logic unit 130.

The communication unit 540 implements communication with other electronic devices or computing devices through a communication medium. Additionally, the functionality of components of the electronic device 500 may be implemented in a single computing cluster or multiple computing machines capable of communicating over a communication connection. Thus, the electronic device 500 may operate in a networked environment using logical connections with one or more other servers, network personal computers (PCs), or another network Node.

The input device 550 may be one or more input devices, such as a mouse, a keyboard, a trackball, or the like. The output device 560 may be one or more output devices, such as a display, a speaker, a printer, or the like. The electronic device 500 may also communicate with one or more external devices (not shown) through the communication unit 540 as needed, external devices such as storage devices, display devices, etc., communicate with one or more devices that enable a user to interact with the electronic device 500, or communicate with any device (e.g., network card, modem, etc.) that enables the electronic device 500 to communicate with one or more other electronic devices or computing devices. Such communication may be performed via an input/output (I/O) interface (not shown).

According to example implementations of the present disclosure, there is provided a computer-readable storage medium having computer-executable instructions stored thereon, wherein the computer-executable instructions are executed by a processor to implement the method described above. According to example implementations of the present disclosure, a computer program product is further provided, the computer program product being tangibly stored on a non-transitory computer-readable medium and including computer-executable instructions, the computer-executable instructions being executed by a processor to implement the method described above.

Aspects of the present disclosure are described herein with reference to flowcharts and/or block diagrams of methods, apparatuses, and computer program products implemented in accordance with the present disclosure. It should be understood that each block of the flowchart and/or block diagram, and combinations of blocks in the flowcharts and/or block diagrams, may be implemented by computer readable program instructions.

These computer-readable program instructions may be provided to a processing unit of a general purpose computer, special purpose computer, or other programmable data processing apparatus to produce a machine, such that the instructions, when executed by a processing unit of a computer or other programmable data processing apparatus, produce means to implement the functions/acts specified in the flowchart and/or block diagram. These computer-readable program instructions may also be stored in a computer-readable storage medium that cause the computer, programmable data processing apparatus, and/or other devices to function in a particular manner, such that the computer-readable medium storing instructions includes an article of manufacture including instructions to implement aspects of the functions/acts specified in the flowchart and/or block diagram (s).

The computer-readable program instructions may be loaded onto a computer, other programmable data processing apparatus, or other apparatus, such that a series of operational steps are performed on a computer, other programmable data processing apparatus, or other apparatus to produce a computer-implemented process such that the instructions executed on a computer, other programmable data processing apparatus, or other apparatus implement the functions/acts specified in the flowchart and/or block diagram block or blocks.

According to one or more embodiments of the present disclosure, Example 1 describes a processor including an instruction decoder configured to decode a target instruction for vector operation. The target instruction involves a target opcode, a source operand, and a target operand. The target opcode indicates a vector operation specified by the target instruction. The source operand specifies at least a source storage location in the memory for reading the data to be processed. The target operand specifies at least a target storage location in the memory for writing a processed result. The processor also includes an arithmetic logic unit coupled to the instruction decoder and the memory. The arithmetic logic unit is configured to: read to-be-processed data from the source storage location of the memory; perform, on the to-be-processed data, an arithmetic logic operation associated with the vector operation specified by the target instruction; and write the processed result of the to-be-processed data to the target storage location of the memory.

According to one or more embodiments of the present disclosure, Example 2 includes the processor as described in Example 1, wherein the target instruction comprises a first index determination instruction, the source operand specifying a location of a first storage space of the memory, the source operand further specifying a given index value of the to-be-processed data within a second storage space of the memory. The arithmetic logic unit is configured as follows to perform an arithmetic logic operation associated with a vector operation specified by the target instruction: determining a first index, the first index indicating a storage location of a value in the to-be-processed data at a location indicated by a given index value in the first storage space.

In accordance with one or more embodiments of the present disclosure, Example 3 includes the processor as described in Example 1, wherein the target instruction comprises a second index determination instruction, the source operand specifying a location of a first storage space of the memory, the source operand further specifying a first immediate. The arithmetic logic unit is configured as follows to perform an arithmetic logic operation associated with a vector operation specified by the target instruction: determining a second index, the second index indicating a storage location of the first immediate in the first storage space.

According to one or more embodiments of the present disclosure, Example 4 includes the processor as described in Example 1, wherein the target instruction comprises a first numerical value determination instruction, the source operand specifying a location of a first storage space of the memory, the source operand further specifying a given index value of the to-be-processed data within a second storage space of the memory. The arithmetic logic unit is configured as follows to perform an arithmetic logic operation associated with a vector operation specified by the target instruction as follows: determining a given value of the to-be-processed data at a location indicated by the given index value; and determining a first value in the first storage space at a location specified at the given value.

In accordance with one or more embodiments of the present disclosure, Example 5 includes the processor as described in Example 1, wherein the target instruction comprises a second value determination instruction, the source operand specifying a given index value of the to-be-processed data within a second storage space of the memory. The arithmetic logic unit is configured as follows to perform an arithmetic logic operation associated with a vector operation specified by the target instruction: determining a second value in the to-be-processed data at a location indicated by a given index value.

In accordance with one or more embodiments of the present disclosure, Example 6 includes the processor as described in Example 1, wherein the target instruction comprises a vector transpose instruction, the source operand specifying at least a first location in a first storage space in the memory. The arithmetic logic unit is configured as follows to perform an arithmetic logic operation associated with a vector operation specified by the target instruction: performing a vector transposition on the to-be-processed data at the first position in the first storage space to obtain transposed to-be-processed data.

In accordance with one or more embodiments of the present disclosure, Example 7 includes the processor as described in Example 1, wherein the target instruction comprises an exponential instruction, the source operand specifying the source storage location. The arithmetic logic unit is configured as follows to perform an arithmetic logic operation associated with a vector operation specified by the target instruction: determining an exponential value with a predetermined value as a base number and with the to-be-processed data at the source storage location as a power.

In accordance with one or more embodiments of the present disclosure, Example 8 includes the processor as described in Example 1, wherein the target instruction comprises a vector mask (VM) register instruction, the source operand indicating a source VM register in the memory. The arithmetic logic unit is configured as follows to perform an arithmetic logic operation associated with a vector operation specified by the target instruction: storing an index at an enabled location in the source VM register at the target storage location.

In accordance with one or more embodiments of the present disclosure, Example includes the processor according to any of Examples 2 to 8, wherein the target storage location comprises a processed result vector, the target operand further indicates a target vector mask (VM) register, and a value at each location of the target VM register indicates whether a corresponding processing result is to be written at a corresponding location of the processing result vector.

In accordance with one or more embodiments of the present disclosure, Example 10 includes the processor as described in example 1, wherein the target instruction comprises a one-hot code conversion instruction, the source operand specifying a given index value of the to-be-processed data within a second storage space of the memory, the target operand specifying a target vector mask (VM) register. The arithmetic logic unit is configured as follows to perform an arithmetic logic operation associated with a vector operation specified by the target instruction: converting the value of the to-be-processed data at a given index value to a one-hot code; and storing the one-hot code into the target VM register.

In accordance with one or more embodiments of the present disclosure, Example 11 describes a method of data processing. The method includes decoding a target instruction for a vector operation, the target instruction involving a target opcode, a source operand, and a target operand. The target opcode indicates a vector operation specified by the target instruction. The source operand specifies at least a source storage location in the memory for reading the data to be processed. The target operand specifies at least a target storage location in the memory for the write processed result. The method further comprises: reading the to-be-processed data from the source storage location of the memory; performing, on the to-be-processed data, an arithmetic logic operation associated with a vector operation specified by the target instruction; and writing a processed result of the to-be-processed data to the target storage location of the memory.

In accordance with one or more embodiments of the present disclosure, Example 12 includes the method described in Example 11, wherein the target instruction comprises an index determination instruction specifying a location of a first storage space of the memory, the source operand further specifying at least one of a given index value of the data to be processed within a second storage space of the memory, a first immediate. Performing the arithmetic logic operation associated with the vector operation specified by the target instruction includes at least one of: determining a first index, where the first index indicates a storage location of a value in the to-be-processed data at a location indicated by a given index value in the first storage space; and determining a second index, where the second index indicates a storage location of the first immediate in the first storage space.

According to one or more embodiments of the present disclosure, example 13 includes the method described in example 11, wherein the target instruction includes a first value determination instruction specifying a location of the first storage space of the memory, the source operand further specifying a given index value of the data to be processed within the second storage space of the memory. Executing the arithmetic logic operation associated with the vector operation specified by the target instruction includes: determining a given value of the data to be processed at a location indicated by the given index value; and determining a first value in the first storage space at a location indexed by the given value.

According to one or more embodiments of the present disclosure, example 14 includes the method described in example 11, wherein the target instruction includes a second value determination instruction specifying a given index value of the data to be processed within a second storage space of the memory.

Executing the arithmetic logic operation associated with the vector operation specified by the target instruction includes determining a second value in the to-be-processed data at a location indicated by the given index value.

In accordance with one or more embodiments of the present disclosure, example 15 includes the method described in example 11, wherein the target instruction comprises a vector transpose instruction, wherein the source operand specifies at least a first location in the first storage space in the memory. Executing the arithmetic logic operation associated with the vector operation specified by the target instruction includes: performing vector translocation on the to-be-processed data at the first location in the first storage space to obtain transposed to-be-processed data.

Example 16 includes the method as described in example 11, wherein the target instruction includes an exponential instruction, the source operand specifies a source storage location, in accordance with one or more embodiments of the present disclosure. Executing the arithmetic logic operation associated with the vector operation specified by the target instruction includes determining an exponent value of the predetermined value as the base number at a power of the to-be-processed data at the source storage location.

Example 17 includes the method as described in example 11, wherein the target instruction comprises a vector mask (VM) register instruction, the source operand indicates a source VM register in the memory, in accordance with one or more embodiments of the present disclosure. Executing the arithmetic logic operation associated with the vector operation specified by the target instruction includes storing the index at the enabled location in the source VM register at the target storage location.

According to one or more embodiments of the present disclosure, example 18 includes the method as described in example 11, wherein the target instruction comprises a one-hot code conversion instruction, the source operand specifies a given index value of data to be processed within a second storage space of the memory, and the target operand specifies a target vector mask (VM) register. Executing the arithmetic logic operation associated with the vector operation specified by the target instruction includes: converting the value of the data to be processed at a given index value to a one-hot code; and storing the one-hot code into the target VM register.

According to one or more embodiments of the present disclosure, example 19 describes an electronic device including at least the processor according to any one of examples 1 to 10.

According to one or more embodiments of the present disclosure, example 20 describes a computer-readable storage medium having a computer program stored thereon. The computer program is executed by a processor to implement the method of any of examples 11 to 18.

The flowchart and block diagrams in the figures show architecture, functionality, and operation of possible implementations of systems, methods, and computer program products according to various implementations of the present disclosure. In this regard, each block in the flowchart or block diagram may represent a module, program segment, or portion of an instruction that includes one or more executable instructions for implementing the specified logical function. In some alternative implementations, the functions noted in the blocks may also occur in a different order than noted in the figures. For example, two consecutive blocks may actually be performed substantially in parallel, which may sometimes be performed in the reverse order, depending on the functionality involved. It is also noted that each block in the block diagrams and/or flowchart, as well as combinations of blocks in the block diagrams and/or flowchart, may be implemented with a dedicated hardware-based system that performs the specified functions or actions, or may be implemented in a combination of dedicated hardware and computer instructions.

Various implementations of the present disclosure have been described above, which are exemplary, not exhaustive, and are not limited to the implementations disclosed. Many modifications and variations will be apparent to those of ordinary skill in the art without departing from the scope and spirit of the various implementations illustrated. The selection of the terms used herein is intended to best explain the principles of the implementations, practical applications, or improvements to techniques in the marketplace, or to enable others of ordinary skill in the art to understand the various implementations disclosed herein.

What is claimed is:
1. A processor, comprising:
an instruction decoder configured to decode at least one target instruction to obtain at least one source storage location in a memory for reading at least one to-be-processed data, at least one target storage location in the memory for writing at least one processed result and at least one vector operation to be performed on the at least one to-be-processed data, each target instruction involving a target opcode indicating a vector operation, a source operand specifying at least a source storage location in the memory, and a target operand specifying at least a target storage location in the memory; and
an arithmetic logic unit coupled to the instruction decoder and the memory and configured to:
read the at least one to-be-processed data from the at least one source storage location of the memory;
perform, on the at least one to-be-processed data, at least one arithmetic logic operation associated with the at least one vector operation specified by the at least one target instruction; and
write at least one processed result of the at least one to-be-processed data to the at least one target storage location of the memory,
wherein the at least one target instruction at least comprises a one-hot code conversion instruction, wherein the source operand of the one-hot code conversion instruction specifies a given index value of the to-be-processed data within a storage space of the memory, the source storage location of the to-be-processed data being indicated by the given index value, the target operand of the one-hot code conversion instruction specifies that the target storage location comprises a target vector mask (VM) register, and
the arithmetic logic unit is configured to perform, based on the one-hot code conversion instruction:

converting the value of the to-be-processed data at the source storage location based on the given index value to a one-hot code; and storing the one-hot code into the target VM register.

2. The processor of claim 1, wherein the at least one target instruction comprises a first index determination instruction, the source operand of the first index determination instruction specifying a location of a first storage space of the memory, and a given index value of the to-be-processed data within a second storage space of the memory, and the arithmetic logic unit is configured as follows to perform an arithmetic logic operation associated with a vector operation specified by the first index determination instruction:

determining a first index, the first index indicating a storage location of a value in the to-be-processed data at a location indicated by the given index value in the first storage space.

3. The processor of claim 1, wherein the at least one target instruction comprises a second index determination instruction, the source operand of the second index determination instruction specifying a location of a first storage space of the memory and a first immediate, and the arithmetic logic unit is configured as follows to perform an arithmetic logic operation associated with a vector operation specified by the second index determination instruction:

determining a second index, the second index indicating a storage location of the first immediate in the first storage space.

4. The processor of claim 1, wherein the at least one target instruction comprises a first numerical value determination instruction, the source operand of the first numerical value determination specifying a location of a first storage space of the memory; and a given index value of the to-be-processed data within a second storage space of the memory, and the arithmetic logic unit is configured as follows to perform an arithmetic logic operation associated with a vector operation specified by the first numerical value determination instruction:

determining a given value of the to-be-processed data at a location indicated by the given index value; and determining a first value in the first storage space at a location specified at the given value.

5. The processor of claim 1, wherein the at least one target instruction comprises a second numerical value determination instruction, the source operand of the second numerical value determination specifying a given index value of the to-be-processed data within a second storage space of the memory, and the arithmetic logic unit is configured as follows to perform an arithmetic logic operation associated with a vector operation specified by the second numerical value determination instruction:

determining a second value in the to-be-processed data at a location indicated by a given index value.

6. The processor of claim 1, wherein the at least one target instruction comprises a vector transpose instruction, the source operand of the vector transpose instruction specifying at least a first location in a first storage space in the memory, and the arithmetic logic unit is configured as follows to perform an arithmetic logic operation associated with a vector operation specified by the vector transpose instruction:

performing a vector translocation on the to-be-processed data at the first location in the first storage space to obtain transposed to-be-processed data.

7. The processor of claim 1, wherein the at least one target instruction comprises an exponential instruction, the source operand of the exponential instruction specifying the source storage location, and the arithmetic logic unit is configured as follows to perform an arithmetic logic operation associated with a vector operation specified by a target vector transpose instruction:

determining an exponent value with a predetermined value as a base number and with the to-be-processed data at the source storage location as a power.

8. The processor of claim 1, wherein the at least one target instruction comprises a vector mask (VM) register instruction, the source operand of the VM register instruction indicating a source VM register in the memory, and the arithmetic logic unit is configured as follows to perform an arithmetic logic operation associated with a vector operation specified by the VM register instruction:

storing an index at an enabled location in the source VM register at the target storage location.

9. The processor of claim 1, wherein a target storage location for writing a processed result of an instruction of the at least one target instruction comprises a processed result vector, the target operand of the instruction further indicates a target vector mask (VM) register, and a value at each location of the target VM register indicates whether a corresponding processed result is to be written at a corresponding location of the processed result vector.

10. A method for data processing comprising:

decoding at least one target instruction to obtain at least one source storage location in a memory for reading at least one to-be-processed data, at least one target storage location in the memory for writing at least one processed result and at least one vector operation to be performed on the at least one to-be-processed data, each target instruction involving a target opcode indicating a vector operation, a source operand specifying at least a source storage location in the memory, and a target operand specifying at least a target storage location in the memory;

reading the at least one to-be-processed data from the at least one source storage location of the memory;

performing, on the at least one to-be-processed data, at least one arithmetic logic operation associated with the at least one vector operation specified by the at least one target instruction; and writing at least one processed result of the at least one to-be-processed data to the at least one target storage location of the memory, wherein the at least one target instruction at least comprises a one-hot code conversion instruction, wherein the source operand of the one-hot code conversion instruction specifies a given index value of the to-be-processed data within a storage space of the memory, the source storage location of the to-be-processed data being indicated by the given index value, the target operand of the one-hot code conversion instruction specifies that the target storage location comprises a target vector mask (VM) register, and wherein performing an arithmetic logic operation specified by the one-hot code conversion instruction comprises:

converting the value of the to-be-processed data at the source storage location based on the given index value to a one-hot code; and storing the one-hot code into the target VM register.

11. The method of claim 10, wherein the at least one target instruction comprises an index determination instruction, the source operand of the index determination instruction specifying a location of a first storage space of the memory and a given index value of the to-be-processed data, and the performing the arithmetic logic operation associated with the vector operation specified by the index determination instruction instruction comprises:

determining a first index, the first index indicating a storage location of a value in the to-be-processed data at a location indicated by a given index value in the first storage space.

12. The method of claim 10, wherein the at least one target instruction comprises a first numerical value determination instruction, the source operand of the first numerical value determination instruction specifying a location of a first storage space of the memory; the and a given index value of the to-be-processed data within a second storage space of the memory, and wherein performing the arithmetic logic operation associated with the vector operation specified by the first numerical value determination instruction comprises:

determining a given value of the to-be-processed data at a location indicated by the given index value; and determining a first value in the first storage space at a location specified at the given value.

13. The method of claim 10, wherein the at least one target instruction comprises a second numerical value determination instruction, the source operand of the second numerical value determination instruction specifying a given index value of the to-be-processed data within a second storage space of the memory, and performing the arithmetic logic operation associated with the vector operation specified by the second numerical value determination instruction comprises determining a second value in the to-be-processed data at a location indicated by a given index value.

14. The method of claim 10, wherein the at least one target instruction comprises a vector transpose instruction, the source operand of the vector transpose instruction specifying at least a first location in a first storage space in the memory, and performing the arithmetic logic operation associated with the vector operation specified by the vector transpose instruction comprises performing a vector transposition on the to-be-processed data at a first position in the first storage space to obtain transposed to-be-processed data.

15. The method of claim 10, wherein the at least one target instruction comprises an exponential instruction, the source operand of the exponential instruction specifying the source storage location, and performing the arithmetic logic operation associated with the vector operation specified by the exponential instruction comprises: determining an exponential value with a predetermined value as a base number and with the to-be-processed data at the source storage location as a power.

16. The method of claim 10, wherein the at least one target instruction comprises a vector mask (VM) register instruction, the source operand of the VM register instruction indicating a source VM register in the memory, and performing the arithmetic logic operation associated with the vector operation specified by the VM register instruction comprises storing an index at an enabled location in the source VM register at the target storage location.

17. A non-transitory computer-readable storage medium having a computer program stored thereon, the computer program being executed by a processor to implement a method comprising:

decoding at least one target instruction to obtain at least one source storage location in a memory for reading at least one to-be-processed data, at least one target storage location in the memory for writing at least one processed result and at least one vector operation to be performed on the at least one to-be-processed data, each target instruction involving a target opcode indicating a vector operation, a source operand specifying at least a source storage location in the memory, and a target operand specifying at least a target storage location in the memory;

reading the at least one to-be-processed data from the at least one source storage location of the memory;

performing, on the at least one to-be-processed data, at least one arithmetic logic operation associated with the at least one vector operation specified by the at least one target instruction; and writing at least one processed result of the at least one to-be-processed data to the at least one target storage location of the memory, wherein the at least one target instruction at least comprises a one-hot code conversion instruction, wherein the source operand of the one-hot code conversion instruction specifies a given index value of the to-be-processed data within a storage space of the memory, the source storage location of the to-be-processed data being indicated by the given index value, the target operand of the one-hot code conversion instruction specifies that the target storage location comprises a target vector mask (VM) register, and wherein performing an arithmetic logic operation specified by the one-hot code conversion instruction comprises:

converting the value of the to-be-processed data at the source storage location based on the given index value to a one-hot code; and storing the one-hot code into the target VM register.

18. The computer readable storage medium of claim 17, wherein the at least one target instruction comprises an index determination instruction, the source operand of a location of a first storage space of the memory, the source-operand further specifying and at least one a first immediate, and the performing the arithmetic logic operation associated with the vector operation specified by the index determination instruction comprises:

determining a second index, the second index indicating a storage location of the first immediate in the first storage space.

* * * * *